US007676653B2

(12) United States Patent
May

(10) Patent No.: US 7,676,653 B2
(45) Date of Patent: Mar. 9, 2010

(54) COMPACT INSTRUCTION SET ENCODING

(75) Inventor: Michael David May, Bristol (GB)

(73) Assignee: XMOS Limited, London (GB)

( * ) Notice: Subject to any disclaimer, the term of this patent is extended or adjusted under 35 U.S.C. 154(b) by 322 days.

(21) Appl. No.: 11/797,968

(22) Filed: May 9, 2007

(65) Prior Publication Data

US 2008/0282066 A1    Nov. 13, 2008

(51) Int. Cl.
  *G06F 9/00*    (2006.01)
(52) U.S. Cl. .................................................... 712/210
(58) Field of Classification Search ................. None
  See application file for complete search history.

(56) References Cited

U.S. PATENT DOCUMENTS

| 5,303,358 | A  | * | 4/1994  | Baum ........................ 712/226 |
| 5,905,893 | A  | * | 5/1999  | Worrell ...................... 717/151 |
| 5,933,627 | A  | * | 8/1999  | Parady ....................... 712/228 |
| 6,301,702 | B1 | * | 10/2001 | Matsumoto et al. ......... 717/138 |
| 6,976,152 | B2 | * | 12/2005 | Yeh et al. .................... 712/217 |

FOREIGN PATENT DOCUMENTS

| EP | 0942357 A  | 9/1999  |
| WO | 97/48041 A | 12/1997 |

OTHER PUBLICATIONS

Patterson, David. Hennessy, John. "Computer Architecture: A Quantitative Approach". Morgan Kaufmann Publishers, Second Edition, 1996. pp. 131 and 278-280.*
"Addressing a Second Page of Registers without increasing the Register Field Length", IBM Technical Disclosure Bulletin, IBM Corp. New York, US, vol. 16, No. 3, Aug. 1, 1973, pp. 771/772, XP002114028.
International Search Report and Written Opinion dated Oct. 8, 2008.

* cited by examiner

*Primary Examiner*—Eddie P Chan
*Assistant Examiner*—Robert Fennema
(74) *Attorney, Agent, or Firm*—Sughrue Mion, PLLC

(57) ABSTRACT

The invention provides a decode unit for decoding instructions in a processor. The decode unit comprises opcode decoding logic, operand decoding logic, and a sixteen-bit input. The opcode decoding logic is operable to determine an opcode using five bits of the input and the operand decoding logic is operable to determine three four-bit operand elements from the remaining eleven bits of the input, the three operand elements each having one of twelve possible binary values. The operand decoding logic is operable to decode an encoded group of the eleven bits to determine a first part of each of the three operand elements, and to read verbatim a verbatim group of the eleven bits to determine a second part of each of the three operand elements.

57 Claims, 10 Drawing Sheets

COMPACT INSTRUCTION SET ENCODING

FIELD OF THE INVENTION

The present invention relates to encoding instructions for a processor, and particularly but not exclusively to an instruction format that is suited to interfacing applications and the managing of multiple instruction threads.

BACKGROUND

A processor instruction can be considered to consist of two portions: an opcode portion and an operand portion. The opcode in the opcode portion defines the type of instruction and, when decoded by the processor's execution unit, causes the processor to perform the corresponding operation (add, subtract, I/O, etc.) The operand portion may contain one or more operand specifiers. These operand specifiers specify which of the processor's operand registers, if any, the instruction defined by the opcode is to operate upon. Alternatively, or additionally, the operand portion may contain an "immediate" operand, i.e. an operand which is contained directly within the operand portion of the instruction, rather than being taken from a specified register. If the instruction does not involve any operands then the operand portion may go unused, or more likely may be used to encode additional opcodes.

Given that the instructions typically have predetermined sizes or formats, this means a trade-off must be made when designing a processor between the size of the opcode and the size of the operand portion.

When small opcodes are used, then only a limited set of instructions can be encoded due to the limited permutations of opcode bits. Such instruction sets would usually comprise only simple, low-level machine code for performing fundamental operations of the processor. This results in a low code density, in the sense that fewer operations can be stored per unit of instruction data, because complex operations must be defined in software as whole sequences of lower-level instructions. In some less usual processors, small opcodes may be used to encode a small number of more complex instructions, whereby complex operations are implemented in hardware and invoked by dedicated instructions. But then the limited number of opcodes available results in the processor only having a very specialised set of possible operations. In any case, small opcodes limit the instruction set size and so limit the processor. However, there is also an advantage in using small opcodes, in that more bits may be available in the instruction for operands.

When large opcodes are used, more numerous types of instruction can be encoded due to the larger number of permutations of opcode bits. Thus, a greater variety of instruction types is available to the processor designer. However, the disadvantage is that fewer bits are available in the instruction for operands.

Thus it can be seen how opcode size must be balanced against the size of the operand portion.

For example, FIG. 1 illustrates a conventional instruction format having sixteen bits i[15:0]. The sixteen instruction bits are each input to an execution unit's decoding logic from an instruction register 50. The decoding logic comprises opcode decoding logic 70 which decodes a four-bit opcode portion 102 of the instruction, and operand decoding logic 80 which determines three four-bit operand specifiers from three respective operand portions 104, 106 and 108 of the instruction. According to this format, each of the three operand specifiers can take a value from zero (0000) to fifteen (1111) in order to specify any one of a set of sixteen operand registers from which to read a source operand or to store a destination operand.

A problem with this conventional sixteen-bit style instructions is that, with sixteen possible operand registers and three operand specifiers 104, 106 and 108, then twelve bits i[11:0] of each instruction are taken up with the operand specifiers. This leaves only four bits i[15:12] for the instruction opcode 102, which only allows sixteen different instructions to be encoded. Existing techniques to overcome this have involved providing restricted operand specifiers (such as ARM Thumb which uses only three bits) or providing most instructions with only two register operands. Other solutions involve moving away from a sixteen-bit instruction format. However, this has its own complications due to the fact that the instruction size is not a conveniently expressed in a number of bytes, or otherwise requires needlessly large twenty-four or thirty-two bit instructions.

Further, the instruction set complexity may affect the processor's speed. Large instruction set processors can sometimes be faster than small instruction set processors because less code is required to execute complex operations. However, the speed of the execution unit is limited by the time to decode the most complex instruction. Therefore larger instruction set processors may actually be slower if there are too many superfluous, unused, or needlessly complex instructions in the set.

Further, compared to large instruction sets, small instruction sets require less hardware logic in the execution unit in order to decode and execute the opcodes, although small sets typically also require more program memory and use more operand registers. The size of the instruction set may therefore have a bearing on the cost, power consumption and silicon area of the processor, depending on the operand registers, decode logic and program memory that are required in conjunction with a particular instruction format.

It is an aim of the present invention to find a preferred balance between the size of an instruction's opcode and the size of it's operand portion, and to achieve this using an encoding scheme which can condense opcodes efficiently into a given instruction length whilst also being quick to decode. It is a particular aim of the invention to find a balance which is advantageous for use in a processor for interfacing with external devices. It is another particular aim of the invention to find a balance which is advantageous for use in a processor for managing the execution of a plurality of threads.

SUMMARY

According to one aspect of the present invention, there is provided a decode unit for decoding instructions in a processor, the decode unit comprising opcode decoding logic, operand decoding logic, and a sixteen-bit input; wherein the opcode decoding logic is operable to determine an opcode using five bits of the input and the operand decoding logic is operable to determine three four-bit operand elements from the remaining eleven bits of the input, the three operand elements each having one of twelve possible binary values; and the operand decoding logic is operable to decode an encoded group of said eleven bits to determine a first part of each of the three operand elements, and to read verbatim a verbatim group of said eleven bits to determine a second part of each of the three operand elements.

The inventors have discovered that this five-bit/eleven-bit split, using the described encoded and verbatim portions, provides an excellent code density for use in an interface processor, and also for processors which handle multiple threads. Further, the invention advantageously allows a relatively large instruction set to be condensed into sixteen bits, using an instruction format that is quick and efficient to decode. Further embodiments as described below provide improved code density and decoding efficiency.

In embodiments, the encoded part may be five bits, the verbatim part may be six bits, the first part of each operand element may be two bits, and the second part of each operand element may be two bits.

The decode unit may comprise switching logic operable to divert at least one of said eleven bits from the operand decoding logic to the opcode decoding logic, wherein the opcode decoding logic may be operable to determine an opcode using said five bits and said at least one diverted bit. The operand decoding logic may be operable to determine at least one operand from the remaining bits of said eleven bits. The switching logic may be configured to divert said at least one bit on the condition that said eleven bits have a value unused to encode said three four-bit operand elements. The switching logic may be configured to divert said at least one bit on the condition that said five bits have a predetermined value or range of values.

Said input may comprise a sixteen bit instruction register. The input of the decode unit may be arranged to receive instructions from a sixty-four bit instruction buffer.

At least one of said operand elements may be an operand specifier for specifying an operand register from any of a set of twelve operand registers. Each of the three operand elements may comprise a respective operand specifier each for specifying an operand register from any of said set. The three operand elements may comprise: one immediate operand, and two operand specifiers for respectively specifying two operand registers from any of said set. The three operands may comprise three source operands.

The three operand elements may comprise: two source operand elements each being either an immediate source operand or a source operand specifier for specifying a respective source operand register from any of said set, and one destination operand specifier for specifying a destination operand register from any of said set; and the decode unit may be operable to execute the corresponding instruction in accordance with the opcode including by operating upon the source operands and storing a result of said operation in the destination operand register.

The switching logic may be operable to divert one of said eleven bits from the operand decoding logic to the opcode decoding logic; the opcode decoding logic may be operable to determine an opcode using said five bits and said one diverted bit, and the operand decoding logic may be operable to determine two four-bit operand specifiers from the remaining ten bits, each four-bit operand specifier having one of twelve possible binary values for specifying an operand register from any of said set of twelve operand registers; and the operand decoding logic may be operable to decode an encoded group of said ten bits to determine a first part of each of the two operand specifiers, and to read verbatim a verbatim group of said ten bits to determine a second part of each of the two operand specifiers.

The decode unit may be arranged to execute multiple threads, each thread comprising a sequence of instructions, and at least one of said decoded instructions being a constituent of one of said sequences. Said at least one instruction may be a thread scheduling instruction for managing the scheduling of one or more of said multiple threads. The processor may comprise a plurality of sets of twelve operand registers, each set being arranged to store operands relating to a respective one of said threads.

At least one of said instructions may be one of: a set event condition instruction for setting a condition associated with an event, a set condition data instruction for setting data associated with an event condition, a set vector instruction for setting a continuation point vector associated with an event, a source event enable instruction for enabling an event source to generate events, and a thread event enable instruction for enabling a thread to react to events.

The decode unit may be operable to concatenate an operand of a prefix instruction with an operand of a subsequently executed instruction.

An execution unit may comprising at least two parallel pipelines configured to execute two respective sixteen-bit instructions simultaneously in parallel, and each pipeline may comprise a decode unit according to any of those described above. The execution unit may be operable in a dual issue and a single issue mode, wherein in the dual issue mode the two pipelines execute two respective instructions simultaneously in parallel and in the single issue mode only one of the pipelines executes an instruction at any given time. The two pipelines may be together operable to execute a thirty-two-bit instruction.

A processor may comprising a decode unit or execution unit according to any of those described above, and the processor may comprise a plurality of sets of twelve operand registers, each set being arranged to store operands relating to a respective one of said threads.

The processor may be an interface processor for interfacing between a first external device and a second external device. The first external device may be another processor and the second external device may be a peripheral device. The first and second external devices may both be other processors.

At least one of said instructions may be one of: an input instruction for inputting data to said interface processor from one of said external devices, and an output instruction for outputting data from said interface processor to one of said external devices.

According to another aspect of the present invention, there is provided a method of decoding instructions in a processor using a decode unit comprising opcode decoding logic, operand decoding logic and a sixteen-bit input, the method comprising: operating the opcode decoding logic to determine an opcode using five bits of the input; and operating the operand decoding logic to determine three four-bit operand elements from the remaining eleven bits of the input, the three operand elements each having one of twelve possible binary values; wherein the step of determining the three operand elements comprises decoding an encoded group of said eleven bits to determine a first part of each of the three operand elements, and reading verbatim a verbatim group of said eleven bits to determine a second part of each of the three operand elements.

According to another aspect of the invention, there is provided a mobile terminal having a mobile applications processor, at least one peripheral device, and an interface processor connected between the mobile applications processor and the peripheral device, the interface processor having a decode unit for decoding instructions in a processor, and the decode unit comprising opcode decoding logic, operand decoding logic, and a sixteen-bit input; wherein the opcode decoding logic is operable to determine an opcode using five bits of the input and the operand decoding logic is operable to determine three four-bit operand elements from the remaining eleven bits of the input, the three operand elements each having one of twelve possible binary values; and the operand decoding logic is operable to decode an encoded group of said eleven bits to determine a first part of each of the three operand elements, and to read verbatim a verbatim group of said eleven bits to determine a second part of each of the three operand elements.

According to another aspect of the present invention, there is provided an array of interconnected processors, at least one of said processors having a decode unit for decoding instructions in a processor, the decode unit comprising opcode decoding logic, operand decoding logic, and a sixteen-bit input; wherein the opcode decoding logic is operable to determine an opcode using five bits of the input and the operand decoding logic is operable to determine three four-bit operand elements from the remaining eleven bits of the input, the three operand elements each having one of twelve possible binary values; and the operand decoding logic is operable to decode an encoded group of said eleven bits to determine a first part of each of the three operand elements, and to read verbatim a verbatim group of said eleven bits to determine a second part of each of the three operand elements.

According to another aspect of the invention, there is provided a processor comprising a decode unit for decoding instructions, the decode unit comprising opcode decoding logic, operand decoding logic, and a sixteen-bit input; wherein the opcode decoding logic is operable to determine an opcode using five bits of the input and the operand decoding logic is operable to determine three four-bit operand elements from the remaining eleven bits of the input, the three operand elements each having one of twelve possible binary values; and the operand decoding logic is operable to decode an encoded group of said eleven bits to determine a first part of each of the three operand elements, and to read verbatim a verbatim group of said eleven bits to determine a second part of each of the three operand elements.

According to another aspect of the invention, there is provided a decode unit for decoding instructions in a processor, the decode unit comprising: a sixteen-bit input means; opcode decoding means for determining an opcode using five bits of the input; and operand decoding means for determining three four-bit operand elements from the remaining eleven bits of the input, the three operand elements each having one of twelve possible binary values; wherein the operand decoding means is for decoding an encoded group of said eleven bits to determine a first part of each of the three operand elements, and for reading verbatim a verbatim group of said eleven bits to determine a second part of each of the three operand elements.

DETAILED DESCRIPTION

For a better understanding of the present invention and to show how the same may be carried into effect, reference will now be made, by way of example, to the corresponding drawings in which.

Figure 1:
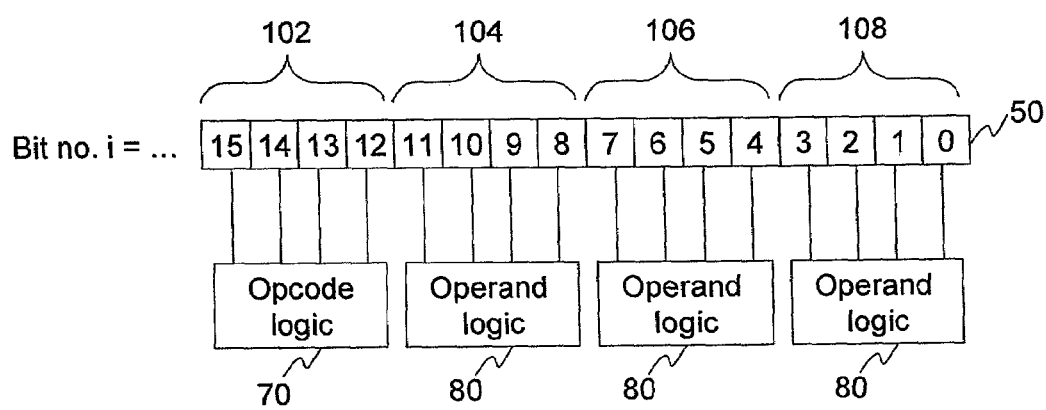
FIG. 1 shows a conventional RISC instruction format.
Figure 2:
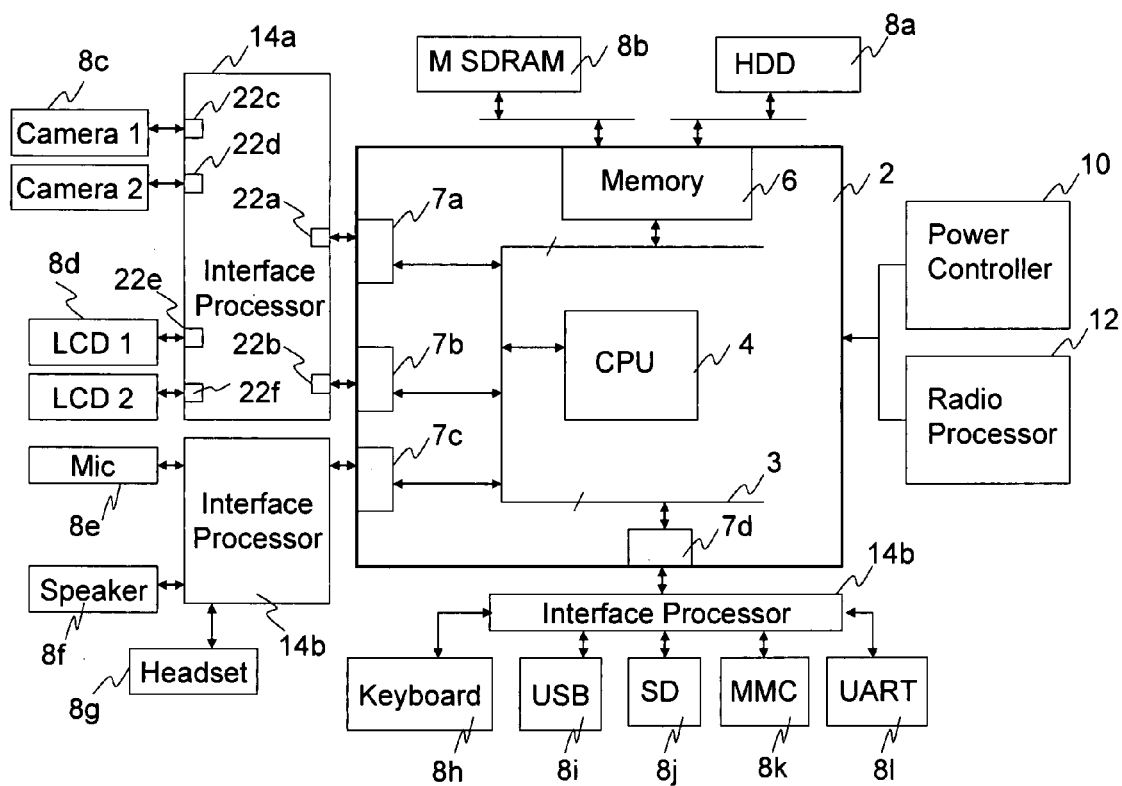
FIG. 2 shows an example application of an interface processor.

As an example of an application in which the present invention may advantageously be employed, FIG. 2 shows an interface processor 14 for use in conjunction with a mobile applications processor 2 of a mobile telephone. The mobile applications processor 2 needs to communicate with the plurality of peripheral devices 8. The applications processor 2 comprises a CPU 4 and a plurality of ports 7 which need to communicate with a plurality of peripheral devices 8c-8l. The mobile applications processor 2 also comprises a memory controller 6 for interfacing with a hard-drive (HDD) 8a and SDRAM memory 8b. The interface controller 6 and ports 7 are typically connected to the CPU 4 via a bus 3. The system also comprises a power controller 10 and radio processor 12.

In this example, generic ports 7a and 7b are provided for interfacing with cameras 8c and LCD displays 8d; a generic port 7c is provided for interfacing with a microphone 8e, speaker 8f and headset 8g; and a generic port 7d is provided for interfacing with a keyboard 8h, a Universal Serial Bus (USB) device 8i, a Secure Digital (SD) card 8j, an Multi-Media Card (MMC) 8k, and a Universal Asynchronous Receiver/Transmitter (UART) device 8l.

In FIG. 2, interface processors 14a, 14b and 14c are placed at the outputs of the relevant ports 7, with a first interface processor 14a being connected between the image devices 8c-8d and the ports 7a-7b, a second interface processor 14b being connected between the audio devices 8e-8g and the port 7c, and a third interface processor 14b being connected between the port 7d and the various connectivity devices 8h-8m. The ports 7 need only be general purpose ports because the application-specific display, audio and connectivity functions are implemented by the interface processors 14a-14c in a manner to be described later. The interface processor 14a has ports 22a and 22b connected to the ports 7a and 7b, and ports 22c, 22d, 22e and 22f connected to the external devices 8c and 8g. The interface processors 14b and 14c have similar ports, not shown in FIG. 2.

The interface processors are typically involved in implementing the specific protocols used to transfer data via the interfaces, re-formatting data including converting it between parallel and serial formats, and possibly higher level functions such as encoding it, compressing it or encrypting it.

Figure 2A:
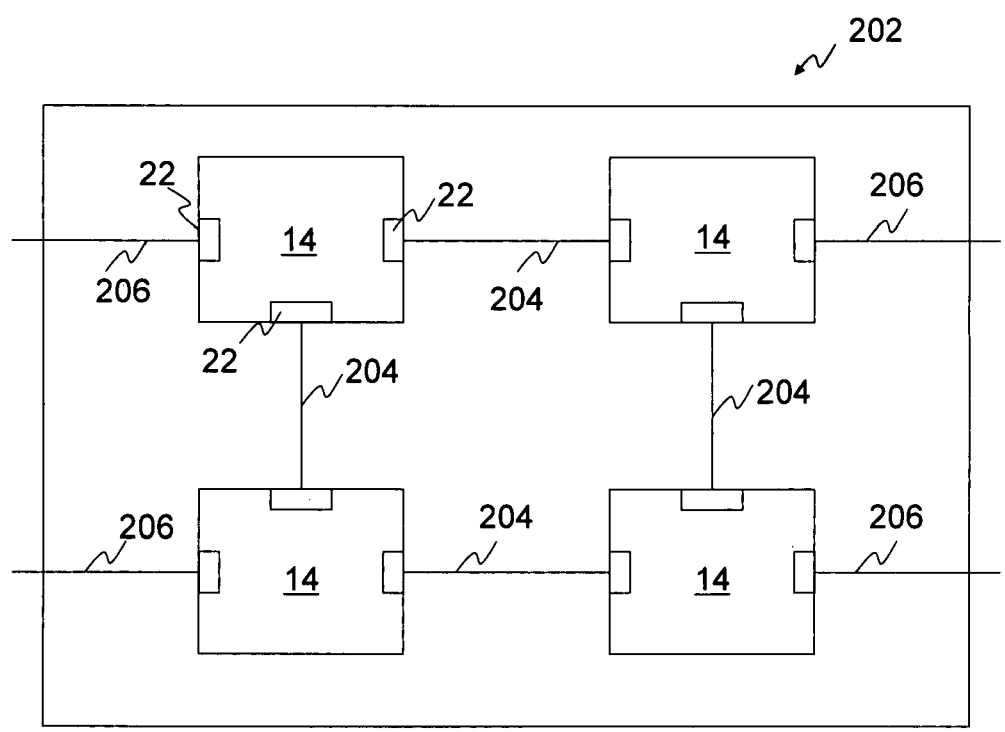
FIG. 2A shows another example application of an interface processor

Another application of an interface processor is as a tile in a multiprocessor chip 202 illustrated in FIG. 2A. Such a chip 202 uses a high performance interconnect 204 which supports communication between the processors 14 on the chip 202, and inter-chip links 206 so that systems can easily be constructed from multiple chips. Each processor 14 is connected to its inter-chip link 206 and high performance interconnects 204 via ports 22.

Advantageously, the interface processors 14 use an instruction format in accordance with the present invention, which is optimised for implementing the various interfacing and input-output (I/O) instructions used to mediate between another processor 2 and one or more peripheral devices 8 or between multiple processors. That is, the instruction format provides a sufficient but not superfluous number of opcodes for performing these operations, and similarly allows for specifying a sufficient but not superfluous number of operands or operand registers. The instructions are also quick and efficient to decode, reducing the required decoding logic and allowing for rapid interfacing.

Another advantageous feature which the instruction format of the present invention accommodates is the ability to manage threads. Each processor has hardware support for executing a number of concurrent program threads, each comprising a sequence of instructions. As will be discussed more fully in the following, the hardware support includes:

a set of registers for each thread, including operand registers;

a thread scheduler which dynamically selects which thread to execute;

a set of ports used for input and output (ports 22);

an interconnect system for establishing channels between registers;

a set of timers to control real-time execution; and a set of clock generators for clocking input and output.

The instruction format of the present invention also allows for a suitable instruction set and operand registers to support the initialization, termination, starting and stopping of threads; and to provide input and output via the ports and inter-thread communications via the channels.

The use of a small set of threads on each processor can be used to allow communications or input/output to progress together with other pending tasks handled by the processor, and to allow latency hiding in the interconnect by allowing some threads to continue whilst others are suspended pending communication to or from remote interface processors.

Figure 3:
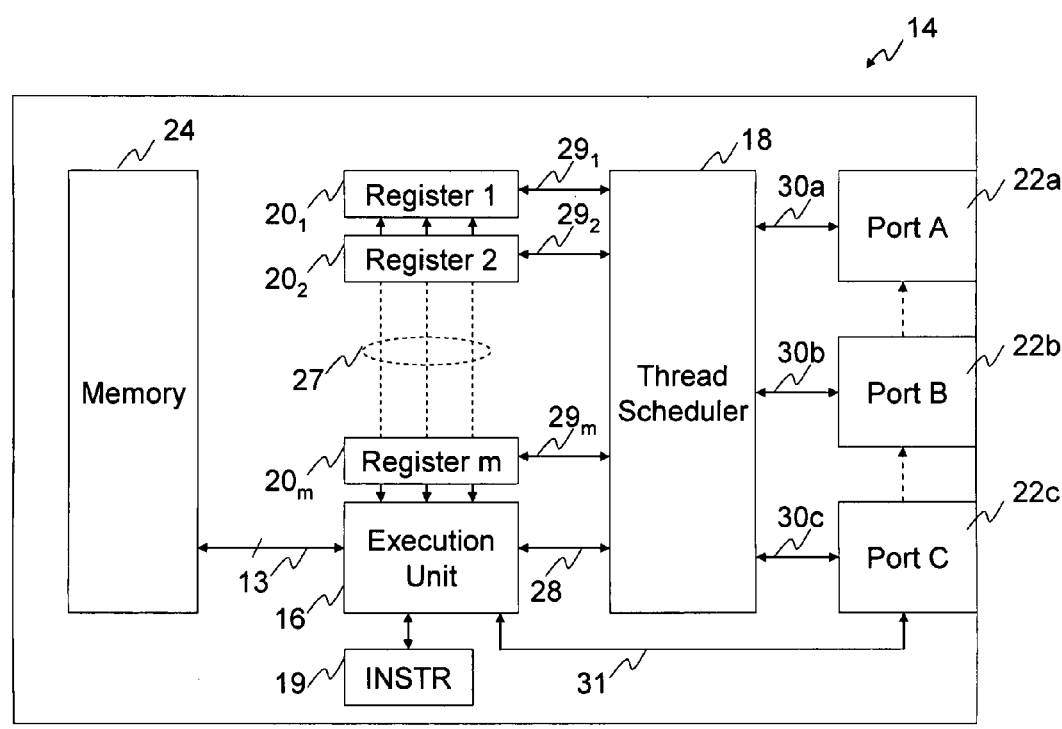
FIG. 3 shows an example processor architecture.

FIG. 3 shows schematically an exemplary architecture of an interface processor 14 according to one embodiment of the present invention. The processor 14 comprises an execution unit 16 for executing threads of instructions under the control of a thread scheduler 18. A Random Access Memory (RAM) 24 is connected to the execution unit via a bus 13, and holds program code and other data. The processor 15 also comprises clocks and timers (not shown), and a Read Only Memory (ROM) (also not shown) for storing permanent information such as boot code.

Each of the m threads under consideration by the thread scheduler 18 is represented by a respective set of thread registers $20_1 \ldots 20_m$ in a bank of registers 20, to which the thread scheduler 18 has access. Instruction buffers (INSTR) 19 are also provided for temporarily holding instructions fetched from memory 24 before being subsequently issued into the execution unit 16.

Figure 4:
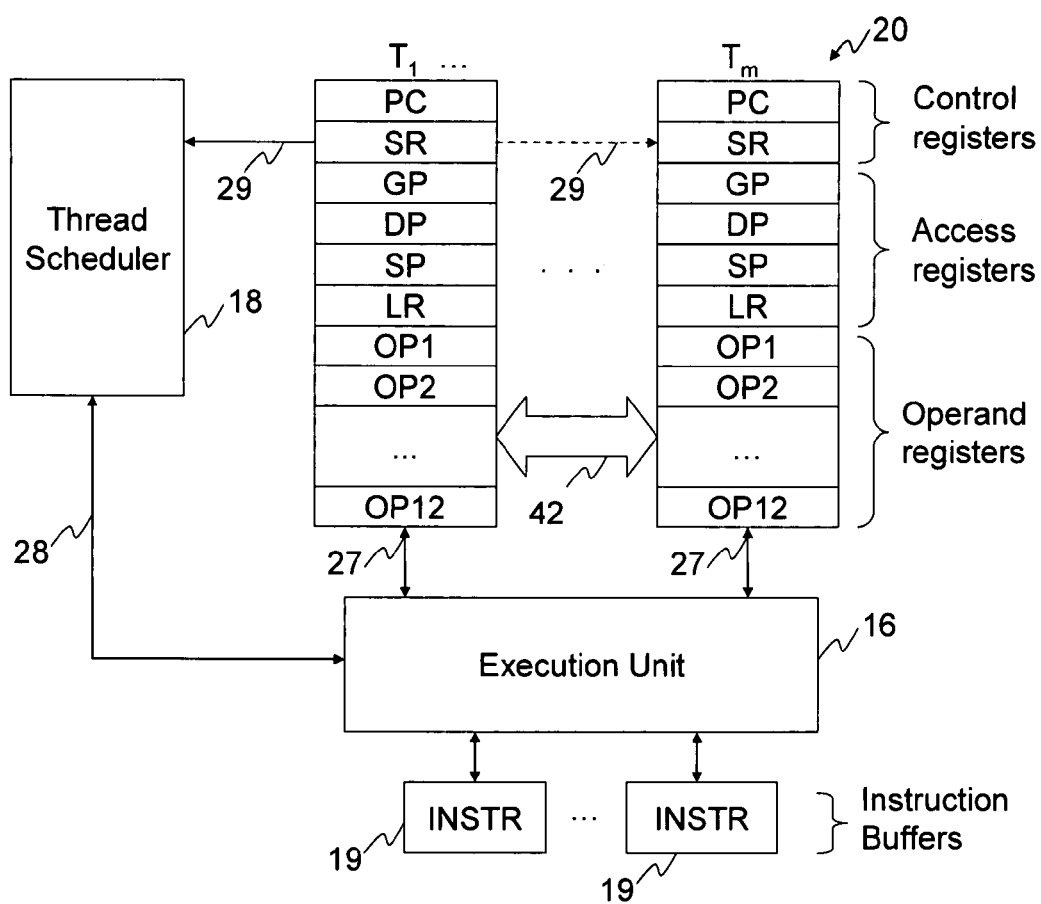
FIG. 4 shows an example register architecture for such a processor.

FIG. 4 shows an exemplary bank of thread registers 20 used to store information relating to the threads. The bank 20 comprises a plurality of sets of registers, each set corresponding to a respective thread $T_1$ to $T_m$ currently under consideration by the thread scheduler 18. In this preferred example, the state of each thread is represented by eighteen registers: two control registers, four access and twelve operand registers. These are as follows.

Control Registers:
PC is the program counter
SR is the status register
Access registers:
GP is the global pool pointer
DP is the data pointer
SP is the stack pointer
LR is the link register Operand Registers: OP1 . . . OP12

The control registers store information on the status of the thread and for use in controlling execution of the thread. Particularly, the ability of a thread to accept events or interrupts is controlled by information held in the thread status register SR. The status register SR may also contain information as to whether the thread is in a single or dual instruction mode, as discussed in further detail below. The access registers include a stack pointer used for local variables of procedures, a data pointer normally used for data shared between procedures and a constant pool pointer used to access large constants and procedure entry points. The operand registers OP1 . . . OP12 are used by instructions which perform arithmetic and logical operations, access data structures, and call subroutines. An interconnect system 42 provides one or more channels for transferring data between the sets of operand registers, preferably from an operand register of one set to an operand register of another set.

A number of instruction buffers (INSTR) 19 are also provided for temporarily storing the actual instructions of the thread. Each instruction buffer is preferably sixty-four bits long, with each instruction preferably being sixteen bits long, allowing for four instructions per buffer. Instructions are fetched from program memory 24 under control of the thread scheduler 18 and placed temporarily in the instruction buffer 19.

The execution unit has access to each of the registers 20 and buffers 19. Further, the thread scheduler 18 has access to at least the status register SR for each thread.

The thread scheduler 18 dynamically selects which thread the execution unit 16 should execute. Conventionally, the function of a thread scheduler would simply be to schedule threads from the program memory in order to keep the processor fully occupied. However, according to embodiments of the present invention, the scheduling by the thread scheduler 18 is also related to activity of the ports 22, channels, clocks and timers. Ports, channels, clocks, and timers are referred to generally herein as "resources". It is noted in this respect that the thread scheduler may be directly coupled to the various resources 22 so as to minimise the delay when a thread becomes runnable as a result of activity at that resource.

Of the m threads, the thread scheduler 18 maintains a set of n runnable threads, the set being termed "run", from which it takes instructions in turn, preferably in a round-robin manner. When a thread is unable to continue it is suspended by removing it from the run set. The reason for this may be, for example, because the thread is awaiting one or more of the following types of activity:

its registers are being initialized prior to it being able to run;
it has attempted an input from a port or channel which is not ready or has no data available;
it has attempted an output to a port or channel which is not ready or has no room for the data;
it has executed an instruction causing it to wait for one or more events, which may be generated when certain conditions are met for a given resource.

When an input or output instruction is encountered within a thread and the relevant port or channel is not ready, then the thread scheduler pauses the thread by removing it from the run set until a ready signal is received from the port or channel. For example, a port or channel may not have data ready to input, or the port or channel's output buffer may be full and so not available for output. Logic associated with the port or channel asserts or de-asserts a ready flag in order to indicate to the thread scheduler whether that port or channel is ready.

If the port or channel is ready before the input or output instruction is executed, then the input or output is completed without pausing.

A thread can also set up a resource to handle an event. To achieve this, the thread contains instructions which when executed transmit a thread identifier, a continuation point vector and a condition to the resource in question. The thread identifier identifies with which thread the event is associated, the continuation point vector identifies a point in the code where execution should continue once the event occurs, and the condition defines what type of event is to be detected. In addition, another instruction may optionally send condition data associated with the condition. Each resource has associated registers for storing the thread identifier, continuation point vector, condition and condition data. For example, if the resource in question is a port, the event may be that some particular data has been received at the port. In this case, the condition would define the event as being an input event, the condition data would specify the particular data to be detected, and the continuation point vector specifies the beginning of some code suitable for handling that data. If the resource is a timer, the event may be that the timer reaches a certain value, or if the resource is a clock then the event may be that a certain clock edge is detected.

Once the event is set up, the thread is suspended by executing a wait instruction and removing it from the run set until the event occurs. Each resource has logic for comparing activity occurring at the resource with the condition. When the activity matches the condition, this logic returns the thread identifier to the thread scheduler and the continuation point vector to the execution unit in order to indicate that the event has occurred. The thread is then resumed by reintroducing to into the run set.

If the condition is satisfied before the wait instruction is executed, the thread will continue without being suspended.

Further event handling instructions include may instructions for enabling and disabling a resource to generate events, instructions for enabling and disabling a thread to accept events, an instruction for allocating a resource to a thread, and an instruction for freeing an allocated resource. Further thread handling instructions may include instructions for reading and writing to the various thread registers.

In additional to instructions for handling I/O and events, an instruction set according to the present invention may also require instructions for initializing threads, as well as more conventional types of instruction such as for arithmetic operations, branching, interrupts, exceptions, traps, debugging, handling stacks and pools, etc. Such conventional types of instruction will be familiar to those skilled in the art.

The following describes an instruction format which is particularly suited to the above twelve-register architecture in conjunction with an instruction set which can accommodate thread scheduling, I/O, event handling and other instructions for operating a processor such as that described above.

Figure 5:
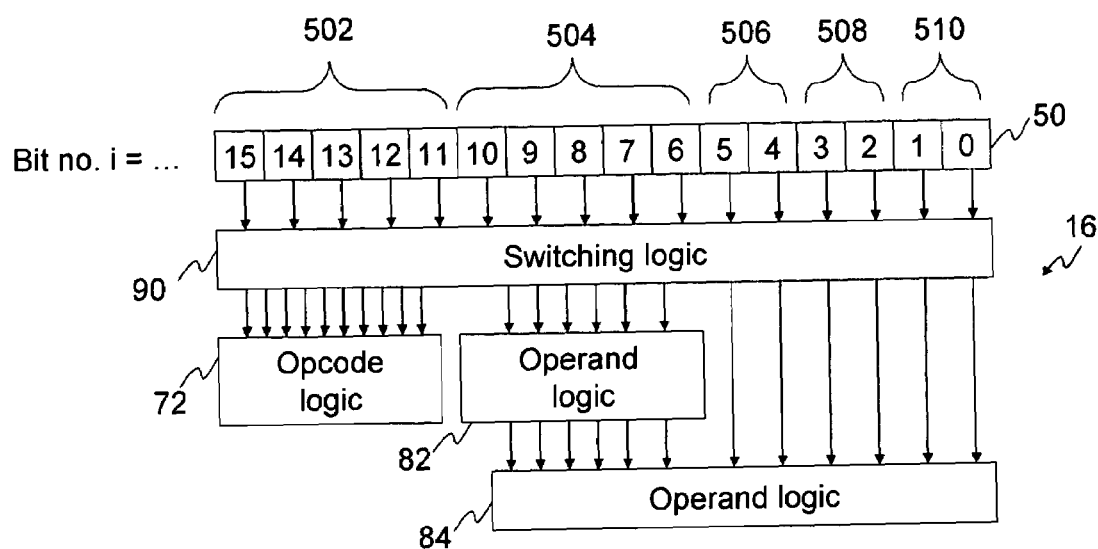
FIG. 5 shows an first example instruction format.

FIG. 5 illustrates a three-operand instruction format according to the present invention, referred to herein as "Format I", along with a schematic example of some associated decode logic 72, 82, 84 and 90.

The instruction format has sixteen bits labelled i[15:0]. The five bits i[15:11] of the instruction are the opcode 502 and the eleven bits i[10:0] are the operand portion. The operand portion i[10:0] may contain up to three operand specifiers. Three four-bit operand specifiers x[3:0], y[3:0] and z[3:0] are encoded into the eleven-bit operand portion i[10:0] of the instruction. For example, y and z may each specify a source operand register and x may specify a destination operand register.

Two bits of each operand specifier x, y and z are simply read "verbatim" from the instruction as follows. These verbatim two-bit portions are labelled 506, 508 and 510 in FIG. 5.

x[1:0]=i[5:4]

y[1:0]=i[3:2]

z[1:0]=i[1:0]

The other two bits of each operand specifier x, y and z (six bits in total) must be decoded from the remaining five bits of the operand portion i[10:6], labelled 510 in FIG. 5. An example decoding is given below. The decoding is preferably implemented in hardware logic, but could in principle be implemented with an algorithm or look-up table.

| Operand specifier bits i[10:6] | Decode to operand address |
| --- | --- |
| 00000 | x[3:2]=00, y[3:2]=00, z[3:2]=00 |
| 00001 | x[3:2]=00, y[3:2]=00, z[3:2]=01 |
| 00010 | x[3:2]=00, y[3:2]=00, z[3:2]=10 |
| 00011 | x[3:2]=00, y[3:2]=01, z[3:2]=00 |
| 00100 | x[3:2]=00, y[3:2]=01, z[3:2]=01 |
| 00101 | x[3:2]=00, y[3:2]=01, z[3:2]=10 |
| 00110 | x[3:2]=00, y[3:2]=10, z[3:2]=00 |
| 00111 | x[3:2]=00, y[3:2]=10, z[3:2]=01 |
| 01000 | x[3:2]=00, y[3:2]=10, z[3:2]=10 |
| 01001 | x[3:2]=01, y[3:2]=00, z[3:2]=00 |
| 01010 | x[3:2]=01, y[3:2]=00, z[3:2]=01 |
| 01011 | x[3:2]=01, y[3:2]=00, z[3:2]=10 |
| 01100 | x[3:2]=01, y[3:2]=01, z[3:2]=00 |
| 01101 | x[3:2]=01, y[3:2]=01, z[3:2]=01 |
| 01110 | x[3:2]=01, y[3:2]=01, z[3:2]=10 |
| 01111 | x[3:2]=01, y[3:2]=10, z[3:2]=00 |
| 10000 | x[3:2]=01, y[3:2]=10, z[3:2]=01 |
| 10001 | x[3:2]=01, y[3:2]=10, z[3:2]=10 |
| 10010 | x[3:2]=10, y[3:2]=00, z[3:2]=00 |
| 10011 | x[3:2]=10, y[3:2]=00, z[3:2]=01 |
| 10100 | x[3:2]=10, y[3:2]=00, z[3:2]=10 |
| 10101 | x[3:2]=10, y[3:2]=01, z[3:2]=00 |
| 10110 | x[3:2]=10, y[3:2]=01, z[3:2]=01 |
| 10111 | x[3:2]=10, y[3:2]=01, z[3:2]=10 |
| 11000 | x[3:2]=10, y[3:2]=10, z[3:2]=00 |
| 11001 | x[3:2]=10, y[3:2]=10, z[3:2]=01 |
| 11010 | x[3:2]=10, y[3:2]=10, z[3:2]=10 |
| 11011 | Alt |
| 11100 | Alt |
| 11101 | Alt |
| 11110 | Alt |
| 11111 | Alt |

Thus using the above scheme, each of the operand specifiers x[3:0], y[3:0] and z[3:0] can take a value from zero (0000) to eleven (1011) to each specify any one of the following twelve operand registers:

| Operand Register | Address |
| --- | --- |
| OP1 | 0000 |
| OP2 | 0001 |
| OP3 | 0010 |
| OP4 | 0011 |
| OP5 | 0100 |
| OP6 | 0101 |
| OP7 | 0110 |
| OP8 | 0111 |
| OP9 | 1000 |
| OP10 | 1001 |
| OP11 | 1010 |
| OP12 | 1011 |

Optionally, some or all of the values x, y and z could instead be used to provide an immediate operand—i.e. the operand itself could be encoded directly into the instruction, rather than being retrieved from a specified register. In a preferred format, only one operand specifier is allowed the option of being replaced with an immediate operand. As with the specifier, the immediate operand would have to be in the range zero to eleven. The values x, y and z may be each be referred to generically herein as an "operand element" to refer to either an operand specifier or an immediate operand.

The decode logic comprises switching logic 90, opcode decoding logic 72, and operand decoding logic 82, 84. The instruction is received by the decoding logic from an instruction register 50. The instruction register 50 may be a separate sixteen-bit register into which the instruction is fetched from the instruction buffer 19, or the instruction register may be may be part of the instruction buffer 19 itself.

In order to decode Format I, the switching logic 90 is operable to supply bits i[15:11] to the opcode decoding logic 72. The switching 90 logic is also operable to supply the encoded operand bits i[10:6] to a decoding section 82 of the operand decoding logic, and the verbatim bits i[5:0] directly to a combining section 84 of the operand decoding logic. The decoding section 82 of the operand decoding logic is operable to decode the encoded bits i[10:6] to determine x[3:2], y[3:2], z[3:2]. The combining section 84 of the operand decoding logic is operable to combine x[3:2] with x[1:0], y[3:2] with y[1:0], and z[3:2] with z[1:0]. The opcode decoding logic 72 is operable to act upon the specified operand registers and/or immediate operands in accordance with the opcode.

Because there are only twelve registers per thread, each of the operand specifiers x[3:0], y[3:0] and z[3:0] need only take a value from zero (0000) to eleven (1011). This means the five bits i[10:6], i.e. the decoded part of the operand portion, need only have a range from zero (00000) to twenty-six (11010). This leaves five values in the range twenty-seven (11011) to thirty-one (11111), marked "Alt" above, unused in the described three-operand format. According to an advantageous embodiment of the present invention, these five values can be used to cause the instruction to be decoded according to an alternate format.

Figure 6:
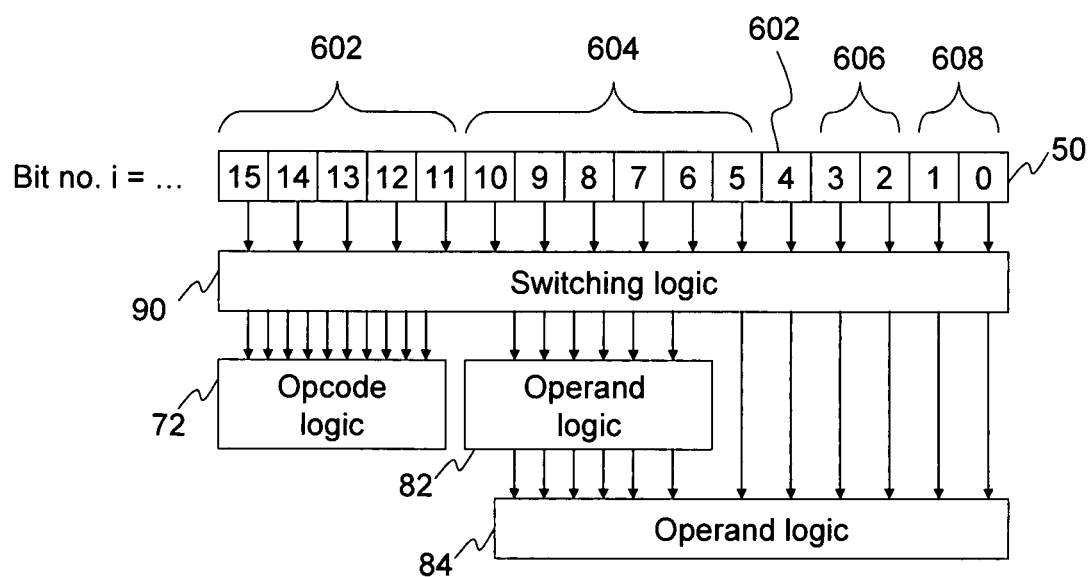
FIG. 6 shows a second example instruction format.

For example, FIG. 6 illustrates an alternate two-operand instruction format according to the present invention, referred to herein as "Format II". Importantly for this particular alternate format, the switching logic is configured to recognise the five-bit portion i[10:6] as being in the range twenty-seven (11011) to thirty-one (11111). This causes the switching logic 90 to recognise the instruction as being of Format II, and supply the bits to the decode logic in an alternate manner to Format I.

According to Format II, the bits i[15:11] and i[4] are the opcode, labelled 602 in FIG. 6. So one of the bits normally used for the operands is instead used to create a six-bit opcode. Two four-bit operand specifiers x[3:0] and y[3:0] are decoded from the bits i[10:5] and i[3:0]. Two bits from each operand specifier x and y are simply read verbatim from the instruction as follows. These verbatim two-bit parts are labelled 606 and 608 in FIG. 6.

x[1:0]=i[3:2]

y[1:0]=i[1:0]

The other two bits of each operand specifier x and y (four bits in total) must be decoded from the remaining six bits of the operand portion i[10:5], labelled 604 in FIG. 6. Remember that i[10:6] can only run from twenty-seven (11011) to thirty-one (11111) in Format II, resulting in only ten possible values when the extra bit i[5] is included. An example decoding is given below.

| Operand specifier bits i[10:5] | Decode to operand address |
|---|---|
| 110110 | x[3:2]=00, y[3:2]=00 |
| 111000 | x[3:2]=00, y[3:2]=01 |
| 111010 | x[3:2]=00, y[3:2]=10 |
| 111100 | x[3:2]=01, y[3:2]=00 |
| 111110 | x[3:2]=01, y[3:2]=01 |
| 110111 | x[3:2]=01, y[3:2]=10 |
| 111001 | x[3:2]=10, y[3:2]=00 |
| 111011 | x[3:2]=10, y[3:2]=01 |
| 111101 | x[3:2]=10, y[3:2]=10 |
| 111111 | Alt |

Thus using the above scheme, each of the operand specifiers x[3:0] and y[3:0] can take a value from zero (0000) to eleven (1011) to each specify any one of the above twelve operand registers.

Optionally, one or both of the operand specifiers x and y could be replaced with an immediate operand. In a preferred format, only one operand specifier is allowed the option of being replaced with an immediate operand. Again, this immediate operand would have to be in the range zero to eleven.

In order to decode Format II, the switching logic 90 is operable to supply bits i[15:11] and i[4] to the opcode decoding logic 72. The switching 90 logic is also operable to supply the encoded operand bits i[10:6] and i[5] to the decoding section 82 of the operand decoding logic, and the verbatim bits i[3:0] directly to a combining section 84 of the operand decoding logic. The decoding section 82 of the operand decoding logic is operable to decode the encoded bits i[10:6] and i[5] to determine x[3:2], y[3:2], z[3:2]. The combining section 84 of the operand decoding logic is operable to combine x[3:2] with x[1:0], y[3:2] with y[1:0], and z[3:2] with z[1:0]. The opcode decoding logic 72 is operable to act upon the specified operand registers and/or immediate operands in accordance with the opcode.

Because there are only twelve registers per thread, each of the operand specifiers x[3:0] and y[3:0] need only take a value from zero (0000) to eleven (1011). This means the six bits i[10:5], i.e. the decoded part of the operand portion, do not make use of the value 1111111 in Format II, marked "Alt" above. This value can be used to cause the instruction to be decoded according to another alternate format.

Figure 7:
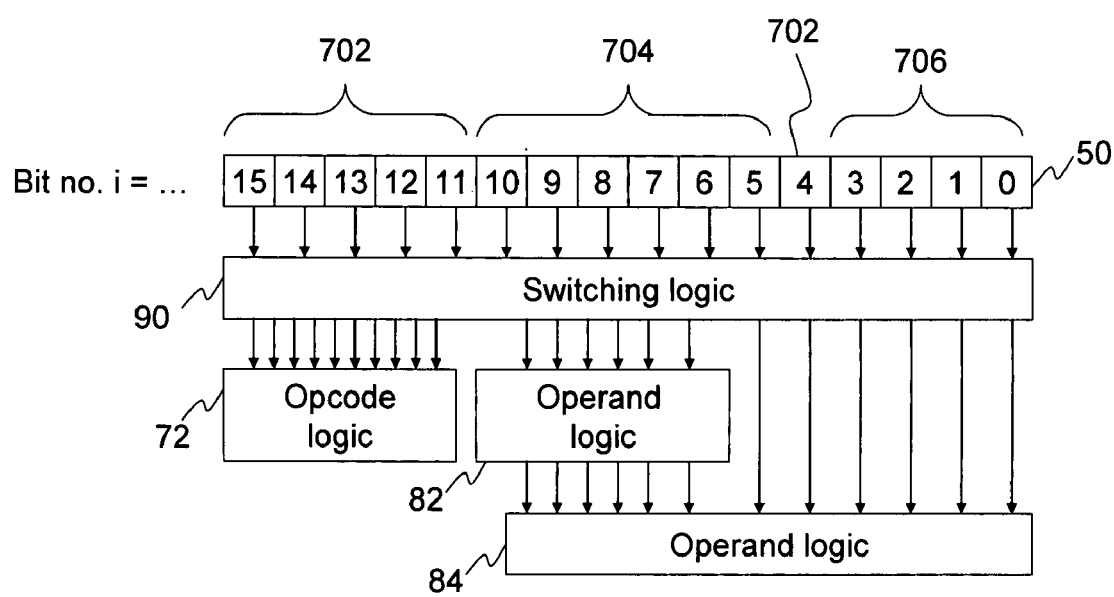
FIG. 7 shows a third example instruction format.

For example, FIG. 7 illustrates an alternate one-operand instruction format according to the present invention, referred to herein as "Format III". Importantly for this particular alternate format, the switching logic is configured to recognise the five-bit portion i[10:6] as being thirty-one (11111) and the bit i[5] as being one (1). This causes the switching logic 90 to recognise the instruction as being of Format III and to supply the bits to the decode logic accordingly.

The portion i[10:5] is marked 704 in FIG. 7. The six-bit opcode is bits i[15:11] and i[4], marked 702 in FIG. 7. The operand specifier x[3:0] is read verbatim from bits i[3:0], labelled 706 in FIG. 7, and is in the range zero (0000) to eleven (1011) in order to specify one of the above twelve operand registers. Alternatively, the operand specifier x could be replaced by an immediate operand in the range zero to eleven.

In order to decode Format III, the switching logic 90 is operable to supply bits i[15:11] and i[4] to the opcode decoding logic 72. The switching 90 logic is also operable to supply the verbatim bits i[3:0] directly without the need for combining or decoding. The opcode decoding logic 72 is operable to act upon the specified operand register or immediate operand in accordance with the opcode.

Because there are only twelve registers per thread, the bits i[3:0] do not make use of the range twelve (1100) to fifteen (1111) in Format III. These values can be used to cause the instruction to be decoded according to yet another alternate format.

Figure 8:
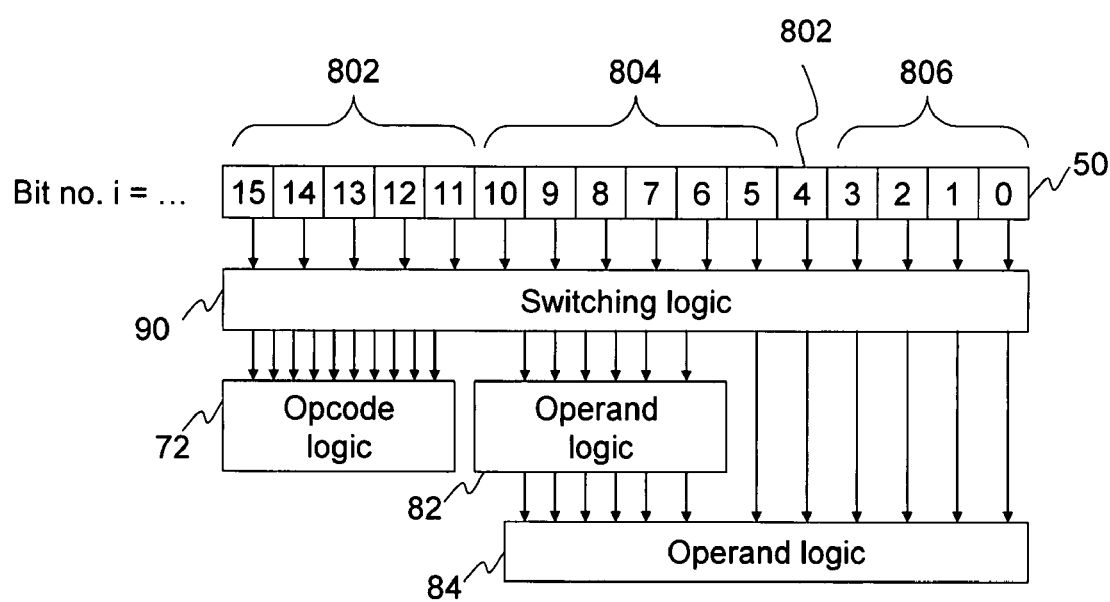
FIG. 8 shows a fourth example instruction format.

For example, FIG. 8 illustrates an alternate zero-operand instruction format according to the present invention, referred to herein as "Format IV". Here, bits i[15:11] and i[4] are the opcode, labelled 802; bits i[10:6] equal thirty-one (11111) and bit i[5] is one (1), together labelled 804; and bits i[3:0] can be anything in the range twelve (1100) to fifteen (1111), labelled 806. The switching logic 90 is configured to recognise bits i[10:5] and i[3:0] as being in this range, and to supply bits i[15:11] and i[4] to the opcode decoding section 72 of the decode logic accordingly.

Other instruction formats can be encoded separately from the above scheme of Formats I-IV. For example, a plurality of formats referred to herein as "Format V", "Format VI", "Format VII" and "Format VIII" each use opcodes of more than five bits. To achieve this, the switching logic 90 must initially recognise the upper five bits i[15:11] as being of a particular pre-determined value or range of values, which causes the decode logic 72, 82, 84 and 90 to decode the instruction according to a particular one of the alternate Formats V-VIII instead of Formats I-IV. Specifically, when the switching logic recognises the bits i[15:11] as having the particular value or range of values, it knows to supply at least bit i[10] and perhaps further bits i[9 . . . ] to the opcode decoding section 72 instead of the operand decoding section 82, 84.

Format V contains one register specifier and one immediate operand. Bits i[15:10] are the opcode, bits i[9:6] are the register specifier, and bits i[5:0] are the immediate operand. In Format V, bits i[9:6] are allowed to take a full range from zero (0000) to fifteen (1111), thus allowing any one of the sixteen registers GP, DP, SP, LR and OP1 . . . OP12 to be operated upon. The registers GP, DP, SP and LR could be addressed for example 1100, 1101, 1110 and 1111 respectively. So instructions of Format V can operate on others of a thread's registers, for example for handling stacks and pools.

Format VI is the same as Format V, except bits i[9:6] are restrained to the range zero (0000) to eleven (1011), such that the register specifier may only specify one of the operand registers OP1 to OP12.

Format VII has a ten-bit opcode and a six-bit immediate operand. Bits i[15:6] are the opcode, with bits i[9:6] being in the range twelve (1100) to fifteen (1111). Bits i[5:0] are the immediate operand.

Format VIII has a six-bit opcode and a ten-bit immediate operand. Bits i[15:10] are the opcode, and bits i[9:0] are the immediate operand.

With regard to the switching logic 90, note that some bits such as i[15:11] which are never switched may be provided directly from the instruction register 50 to the opcode decoding portion 72, rather than passing through the switching logic 90 is illustrated in FIGS. 6 to 9. But nonetheless, in embodiments, the switching logic 90 must be able to read at least some of bits i[15:11] in order to detect that the instruction is to be decoded according to one of Formats V to VIII.

According to a preferred embodiment, the execution unit supports prefix instructions. Prefixes are used to extend the range of immediate operands, and to provide more inter-register operations, or inter-register operations with more operands. The prefixes instructions are inserted automatically by compilers and assemblers. The prefix instructions are as follows.

PFIX This instruction concatenates its ten-bit immediate operand with the immediate operand of the subsequent sixteen-bit instruction. It is of Format VIII.

EOPR This instruction concatenates its eleven-bit operand portion with the subsequent instruction. It has another format simply with bits i[15:11] as the opcode and bits i[10:0] as the immediate operand.

Figure 9:
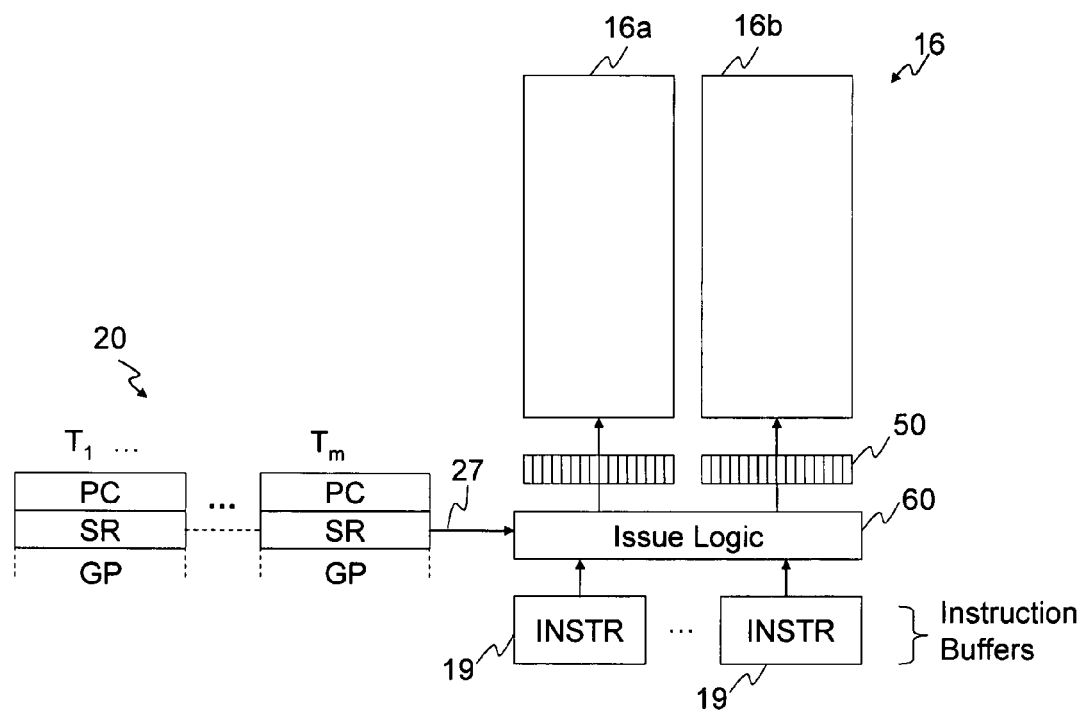
FIG. 9 shows an example of a dual instruction issue feature.

Another preferred feature is that of dual instruction issue, as illustrated in FIG. 9. Here, the execution unit 16 actually comprises at least two parallel execution units, preferably parallel pipelines 16a and 16b. The execution unit comprises issue logic 60 configured such that two sixteen-bit instructions, each of a format as described above, can be issued at once into two respective pipelines 16a, 16b. In a processor such as described in relation to FIGS. 2 to 4, the dual issue feature can increase performance by 50% to 90% depending on the application without increasing clock rate. There is an overhead of up to 25% in program memory use.

Preferably the two pipelines have different capabilities. The first instruction as executed by pipeline 16a may be one of an Arithmetic Logic Unit (ALU) type instruction, a memory access instruction, or a branch instruction. The second instruction as executed by pipeline 16b may be one of an ALU-type instruction or an input-output instruction. This requires an additional decoder and an additional ALU, but also advantageously reduces complexity since there is no need for a single pipeline to handle both memory access instructions and resource instructions. Further, the processor need make no dependency checks on the two sixteen-bit instructions in each pair, because the compiler allocates the pair such that no dependency exists between them.

The available instruction set is based on two instruction lengths. Sixteen-bit instructions, or "short" instructions, have at most two source operands and at most one destination operand. The complete set of these encodes all of the commonly used instructions in general purpose codes. Thirty-two-bit instructions, or "long" instructions, have at most four source operands and at most two destination operands. These encode the less common instructions in general purpose codes (including those with long immediate operands) and also a number of multi-operand instructions which significantly increase performance of application specific codes.

The dual issue operates by issuing, every cycle, either a pair of sixteen-bit instructions 50 into two parallel pipelines or a single thirty-two-bit instruction into one pipeline. For single issue, a single sixteen-bit is simply issued into the appropriate pipeline. For example, all resource instructions may be routed to the second pipeline 16b. When performing dual-issue, branch offsets are interpreted as thirty-two-bit offsets and always branch to a pair of sixteen-bit instructions or to a single thirty-two-bit instruction.

A flag in the thread status register (SR) is used to determine whether the thread is performing dual-issue or single-issue. The issue logic 60 has access to the SR register from each set of thread registers 20, and is configured to issue instructions 50 according to either the single or dual issue mode. Thus by means of the status register SR, some of the threads T under consideration by the thread scheduler 18 at any given time may be in a single-issue mode whilst others of those threads may be in a dual issue mode. This advantageously allows greater flexibility in the management of multiple threads. In embodiments, there may be no support for transferring control between dual-issue and single-issue on the same thread.

Dual code is produced by a code scheduler in an assembler, so that it optimises both compiled and hand coded software. The code is larger than in normal execution, but the extra reach of the program offsets ensures that no changes other than reordering and padding with "no-op" instructions is required (no-op instructions are issued when the scheduler thread has no instruction in its instruction buffer).

The program memory 24 may be implemented as two banks which can be accessed in parallel. One holds even numbered addresses and the other holds odd numbered addresses. Instruction fetches will always fetch sixty-four bits (the instruction buffers 19 are each sixty-four bits wide). The thirty-two-bit instructions, and the pairs of sixteen-bit instructions, must be aligned on thirty-two-bit boundaries in memory. Dual program addresses are all thirty-two-bit aligned and program offsets are all scaled by four instead of two. This arrangement can also work for sixty-four-bit implementations by making the memory access instructions operate using both memory banks—like instruction fetch. There may be no difference in performance except for the benefits of sixty-four-bit data types.

Other features to aid the dual instruction issue may involve: using a register file supporting four read ports and two write ports, which would only have a negligible performance impact; and modifying trap-handling so that it is possible to handle situations in which more than once trap is raised at once. This double trap handling can be achieved by a bit in status register SR to indicate whether the trap has been raised by the first or second instruction of the pair. If both instructions raise traps, they can be handled one at a time.

The following are examples of three, two, one and zero operand instructions that can be encoded according to the present invention. The abbreviation "reg" as used below refers to a register, "op reg" to an operand register, "imm" to an immediate operand, and "dest" to a destination operand register.

| | |
|---|---|
| ADDI dest, source, constant | add source to constant (two op regs & 4-bit imm) |
| MUL dest, source1, source2 | multiply source1 by source2 (three op regs) |
| LSU dest, source1, source2 | less than unsigned (three op regs) |
| STW data, base offset | store data to memory (three op regs) |
| LDW data, base, offset | load data from memory (three op regs) |
| LDWSP data, offset | load data from stack (any reg & 6-bit imm) |
| LDC data, constant | load constant (any reg & 6-bit imm) |
| STB data, addr | store byte to memory (two op regs) |
| BRFT flag, offset | branch forward if flag true (op reg & 6-bit imm) |
| BRBF flag, offset | branch backward if flag false (op reg & 6-bit imm) |
| BRFU offset | branch relative forward unconditional (6-bit imm) |
| BLRF offset | branch and link relative forward (10-bit imm subroutine call) |
| GETR resource, type | allocate resource to a thread (two op-regs) |
| IN resource, data | input (two op regs) |
| OUT resource, data | output (two op regs) |
| INSHR resource, data | input and shift right (two op regs) |
| NOT dest, source | bitwise not (two op regs) |
| EET flag, resource | enable event if flag true (two op regs) |
| EEU resource | enable event unconditional (one op reg) |
| WAITEU | wait event unconditional (no operand) |
| CLRE | clear events for a thread (no operand) |

Here are a few examples of dual instruction issue. Where two instructions are shown on the same line, this indicates that the instructions are issued together into the two parallel pipelines.

The first example performs a multiply-accumulate of two arrays a and b:

| MACC: | |
|---|---|
| LDW x, a, i | LSU go, i, limit |
| LDW y, b, i | ADD i, i, 1 |
| MUL prod, x, y | |
| BRBF go, MACC | ADD sum, sum, prod |

The next two perform the same input and output functions as would normally be performed by a DMA (direct memory access) controller. They transfer a block of words using channel c starting at address base in memory:

| DMAI: | |
|---|---|
| LSU go, i, limit | IN c, x |
| STXN x, base, i | |
| BRBF go, DMAI | ADDI i, i, 1 |
| DMAO: | |
| LDW x, base, i | LSU go, l, limit |
| ADDI i, i, 1 | OUT c, x |
| BRBF go, DMAO | |

The next example performs input from the media independent interface used by in Ethernet. It shifts in data from a 4-bit dport and valid signals from a 1-bit vport. Each pair of 4-bit values forms a byte and each byte is stored in memory. The valid signals are checked every byte to determine when the sequence of bytes has come to an end.

| MACI: | |
|---|---|
| STB data, ptr | INSHR dport, data |
| ADDI ptr, ptr, 1 | INSHR vport, valid |
| NOT go, valid | INSHR dport, data |
| BRBF go, MACI | INSHR vport, valid |

The last example shows data being input at a port rate of one item (bit, nibble, byte etc) per instruction cycle. This can be done whilst counting through tokens and/or scanning for terminating token values. The items can be converted to and from bytes, half-words or words, and transferred to and from memory.

It will be appreciated that the above embodiments are described only by way of example. The instruction formats of the present invention have been described as being particularly useful in relation to interface processors and instruction sets for and thread scheduling, event handling and I/O. However, the invention is not limited to such embodiments, and other applications and instruction sets may be apparent to a person skilled in the art. Further, in other embodiments different encoding/decoding schemes, prefixes and/or parallel pipeline arrangements could be used. The scope of the invention is not limited by the described embodiments, but only by the following claims.

The invention claimed is:

1. A decode unit for decoding instructions in a processor, the decode unit comprising opcode decoding logic, operand decoding logic, and a sixteen-bit input;
wherein the opcode decoding logic is operable to determine an opcode using five bits of the sixteen-bit input, there thus being eleven other bits of the sixteen-bit input, and the operand decoding logic is operable to determine three four-bit operand elements from the eleven other bits of the sixteen-bit input, the three four-bit operand elements each having one of twelve possible binary values; and the operand decoding logic is operable to decode a non-verbatim encoded group of said eleven other bits of the sixteen-bit input to determine a first part of each of the three four-bit operand elements, and to read verbatim a verbatim group of said eleven other bits of the sixteen-bit input to determine a second part of each of the three four-bit operand elements.

2. The decode unit according to claim 1, further comprising switching logic operable to divert at least one divertible bit of said eleven other bits from the operand decoding logic to the opcode decoding logic, wherein the opcode decoding logic is operable to determine an opcode using said five bits of the sixteen-bit input and said at least one divertible bit when diverted.

3. The decode unit according to claim 2, wherein the operand decoding logic is operable to determine at least one operand from remaining bits of said eleven other bits of the sixteen-bit input remaining when said at least one divertible bit is diverted.

4. The decode unit according to claim 2, wherein the switching logic is configured to divert said at least one divertible bit on condition that said eleven bits have a value unused to encode said three four-bit operand elements.

5. The decode unit according to claim 2, wherein the switching logic is configured to divert said at least one divertible bit on condition that said five bits of the sixteen-bit input have a predetermined value or range of values.

6. The decode unit according to claim 1, wherein the non-verbatim encoded group is five bits, the verbatim group is six bits, the first part of each four-bit operand element is two bits, and the second part of each four-bit operand element is two bits.

7. The decode unit according to claim 1, wherein said sixteen-bit input comprises a sixteen bit instruction register.

8. The decode unit according to claim 1, wherein at least one of said four-bit operand elements is an operand specifier for specifying an operand register from any of a set of twelve operand registers.

9. The decode unit according to claim 8, wherein each of the three four-bit operand elements comprises a respective operand specifier each for specifying an operand register from any of said set.

10. The decode unit according to claim 8, wherein the three four-bit operand elements comprise: one immediate operand, and two operand specifiers for respectively specifying two operand registers from any of said set.

11. The decode unit according to claim 8, wherein the three four-bit operand elements comprise: one destination operand specifier for specifying a destination operand register from any of said set, and two source operand elements each being either an immediate source operand or a source operand specifier for specifying from any of said set a respective source operand register storing a source operand; and the decode unit is operable to execute an instruction in accordance with the opcode including by performing an operation upon the source operands and storing a result of said operation in the destination operand register.

12. The decode unit according to claim 1, wherein the three four-bit operand elements comprise three source operands.

13. The decode unit according to claim 1, wherein:

the decode unit comprises switching logic operable to divert at least one divertible bit of said eleven other bits from the operand decoding logic to the opcode decoding logic, wherein the opcode decoding logic is operable to determine an opcode using said five bits of the sixteen-bit input and said at least one diverted divertible bit when diverted;

the operand decoding logic is operable to determine at least one operand from the remaining bits of said eleven other bits of the sixteen-bit input remaining when said at least one divertible bit is diverted;

the switching logic is configured to divert said at least one divertible bit on a condition that said eleven bits have a value unused to encode said three four-bit operand elements;

at least one of said four-bit operand elements is an operand specifier for specifying an operand register from any of a set of twelve operand registers;

the switching logic is operable to divert one of said eleven bits from the operand decoding logic to the opcode decoding logic;

the opcode decoding logic is operable to determine an opcode using said five bits and said one diverted bit, and the operand decoding logic is operable to determine two four-bit operand specifiers from the remaining ten bits, each four-bit operand specifier having one of twelve possible binary values for specifying an operand register from any of said set of twelve operand registers; and the operand decoding logic is operable to decode an encoded group of said ten bits to determine a first part of each of the two operand specifiers, and to read verbatim a verbatim group of said ten bits to determine a second part of each of the two operand specifiers.

14. The decode unit according to claim 1, wherein the decode unit is arranged to execute multiple threads, each thread comprising a sequence of instructions, and at least one of the instructions by the decode unit being a constituent of one of said sequences of instructions.

15. The decode unit according to claim 14, wherein said at least one of the instructions decoded by the decode unit is a thread scheduling instruction for managing scheduling of one or more of said multiple threads.

16. The decode unit according to claim 1, wherein at least one of said instructions is one of: a set event condition instruction for setting a condition associated with an event, a set condition data instruction for setting data associated with an event condition, a set vector instruction for setting a continuation point vector associated with an event, a source event enable instruction for enabling an event source to generate events, and a thread event enable instruction for enabling a thread to react to events.

17. The decode unit according to claim 1, wherein the decode unit is operable to concatenate an operand of a prefix instruction with an operand of a subsequently executed instruction.

18. The decode unit according to claim 1, wherein the sixteen-bit input is arranged to receive instructions from a sixty-four bit instruction buffer.

19. An execution unit comprising at least two parallel pipelines operable to execute two respective sixteen-bit instructions simultaneously in parallel, each pipeline comprising an instance of the decode unit according to claim 1.

20. The execution unit according to claim 19, wherein the execution unit is operable in a dual issue and a single issue mode, wherein in the dual issue mode the execution unit is operable to issue two sixteen-bit instructions into the two parallel pipelines respectively in a single cycle and in the single issue mode is operable to issue only one sixteen-bit instruction into a pipeline in a single cycle.

21. The execution unit according to claim 19, wherein the execution unit is operable to issue a thirty-two-bit instruction into one of said at least two parallel pipelines in a single cycle.

22. A processor comprising the decode unit according to claim 14, the processor comprising a plurality of sets of twelve operand registers, each set being arranged to store operands relating to a respective one of said threads.

23. A processor comprising the decode unit according to claim 1, wherein the processor is an interface processor for interfacing between a first external device and a second external device.

24. The processor according to claim 23, wherein the first external device is another processor and the second external device is a peripheral device.

25. The processor according to claim 23, wherein the first and second external devices are both other processors.

26. The processor according to claim 23, wherein at least one of the instructions decoded by the decode unit is one of: an input instruction for inputting data to said interface processor from one of said external devices, and an output instruction for outputting data from said interface processor to one of said external devices.

27. A method of decoding instructions in a processor using a decode unit comprising opcode decoding logic, operand decoding logic and a sixteen-bit input, the method comprising:
operating the opcode decoding logic to determine an opcode using five bits of the sixteen-bit input, there thus being eleven other bits of the sixteen-bit input; and
operating the operand decoding logic to determine three four-bit operand elements from the eleven other bits of the sixteen-bit input, the three four-bit operand elements each having one of twelve possible binary values;
wherein the operating step to determine three four-bit operand elements comprises decoding a non-verbatim encoded group of said eleven other bits of the sixteen-bit input to determine a first part of each of the three four-bit operand elements, and reading verbatim a verbatim group of said eleven other bits of the sixteen-bit input to determine a second part of each of the three four-bit operand elements.

28. The method according to claim 27, further comprising:
diverting at least one divertible bit of said eleven other bits of the sixteen-bit input from the operand decoding logic to the opcode decoding logic; and
operating the opcode decoding logic to determine an opcode using said five bits of the sixteen-bit input and said at least one divertible bit when diverted.

29. The method according to claim 28, further comprising operating the operand decoding logic to determine at least one operand from remaining bits of said eleven other bits of the sixteen-bit input remaining when said at least one divertible bit is diverted.

30. The method according to claim 28, wherein the step of diverting said at least one divertible bit is performed on condition that said eleven bits have a value unused to encode said three four-bit operand elements.

31. The method according to claim 28, wherein the step of diverting said at least one divertible bit is performed on condition that said five bits of the sixteen-bit input have a predetermined value or range of values.

32. The method according to claim 27, wherein the non-verbatim encoded group is five bits, the verbatim group is six bits, the first part of each four-bit operand element is two bits, and the second part of each four-bit operand element is two bits.

33. The method according to claim 27, wherein said sixteen-bit input comprises a sixteen bit instruction register.

34. The method according to claim 27, wherein at least one of said four-bit operand elements is an operand specifier for specifying an operand register from any of a set of twelve operand registers.

35. The method according to claim 34, wherein each of the three four-bit operand elements comprises a respective operand specifier each for specifying an operand register from any of said set.

36. The method according to claim 34, wherein the three four-bit operand elements comprise: one immediate operand, and two operand specifiers for respectively specifying two operand registers from any of said set.

37. The method according to claim 34, wherein the three four-bit operand elements comprise: one destination operand specifier for specifying a destination operand register from any of said set, and two source operand elements each being either an immediate source operand or a source operand specifier for specifying from any of said set a respective source operand register storing a source operand; and
the method comprises executing an instruction in accordance with the opcode including performing an operation upon the source operands and storing a result of said operation in the destination operand register.

38. The method according to claim 27, wherein the three four-bit operand elements comprise three source operands.

39. The method according to claim 27, further comprising:
diverting at least one divertible bit of said eleven other bits of the sixteen-bit input from the operand decoding logic to the opcode decoding logic;
operating the opcode decoding logic to determine an opcode using said five bits of the sixteen-bit input and said at least one diverted divertible bit when diverted; and
operating the operand decoding logic to determine at least one operand from the remaining bits of said eleven other bits of the sixteen-bit input remaining when said at least one divertible bit is diverted;
wherein the step of diverting said at least one divertible bit is performed on the condition that said eleven bits have a value unused to encode said three four-bit operand elements;
at least one of said four-bit operand elements is an operand specifier for specifying an operand register from any of a set of twelve operand registers; and
the method further comprises:
diverting one of said eleven bits from the operand decoding logic to the opcode decoding logic;
operating the opcode decoding logic to determine an opcode using said five bits and said one diverted bit; and
operating the operand decoding logic to determine two four-bit operand specifiers from the remaining ten bits, each four-bit operand specifier having one of twelve possible binary values for specifying an operand register from any of said set of twelve operand registers;
wherein the step of determining the two operand specifiers comprises decoding an encoded group of said ten bits to determine a first part of each of the two operand specifiers, and reading verbatim a verbatim group of said ten bits to determine a second part of each of the two operand specifiers.

40. The method according to claim 27, further comprising operating the decode unit to execute multiple threads, each thread comprising a sequence of instructions, and at least one of the instructions decoded by the decode unit being a constituent of one of said sequences of instructions.

41. The method according to claim 40, wherein said at least one of the instructions decoded using the decode unit is a thread scheduling instruction for managing scheduling of one or more of said multiple threads.

42. The method according to claim 27, wherein at least one of said instructions is one of: a set event condition instruction for setting a condition associated with an event, a set condition data instruction for setting data associated with an event condition, a set vector instruction for setting a continuation point vector associated with an event, a source event enable instruction for enabling an event source to generate events, and a thread event enable instruction for enabling a thread to react to events.

43. The method according to claim 27, further comprising operating the decode unit to concatenate an operand of a prefix instruction with an operand of a subsequently executed instruction.

44. The method according to claim 27, further comprising receiving instructions at said sixteen-bit input from a sixty-four bit instruction buffer.

45. The method according to claim 27, further comprising executing at least two sixteen-bit instructions simultaneously using an execution unit comprising two respective parallel pipelines, each pipeline being operated according to said operating step to determine an opcode and said operating step to determine operand elements.

46. The method according to claim 45, further comprising selecting between operating the execution unit in a dual issue and a single issue mode, wherein in the dual issue mode the execution unit is operable to issue two sixteen-bit instructions into the two parallel pipelines respectively in a single cycle and in the single issue mode the execution unit is operable to issue only one sixteen-bit instruction into a pipeline in a single cycle.

47. The method according to claim 45, further comprising operating one of said pipelines to execute a thirty-two-bit instruction in a single cycle.

48. The method according to claim 40, further comprising storing operands relating to respective threads in respective sets of twelve operand registers.

49. The method according to claim 27, wherein the processor is an interface processor and the method comprises using the processor to interface between a first external device and a second external device.

50. The method according to claim 49, wherein the first external device is another processor and the second external device is a peripheral device.

51. The method according to claim 49, wherein the first and second external devices are both other processors.

52. The method according to claim 49, wherein at least one of the instructions decoded using the decode unit is one of: an input instruction for inputting data to said interface processor from one of said external devices, and an output instruction for outputting data from said interface processor to one of said external devices.

53. A mobile terminal having a mobile applications processor, at least one peripheral device, and an interface processor connected between the mobile applications processor and the peripheral device, the interface processor having a decode unit for decoding instructions in a processor, and the decode unit comprising opcode decoding logic, operand decoding logic, and a sixteen-bit input;

wherein the opcode decoding logic is operable to determine an opcode using five bits of the sixteen-bit input, there thus being eleven other bits of the sixteen-bit input, and the operand decoding logic is operable to determine three four-bit operand elements from the eleven other bits of the sixteen-bit input, the three four-bit operand elements each having one of twelve possible binary values; and wherein the operand decoding logic is operable to decode a non-verbatim encoded group of said eleven other bits of the sixteen-bit input to determine a first part of each of the three four-bit operand elements, and to read verbatim a verbatim group of said eleven other bits of the sixteen-bit input to determine a second part of each of the three four-bit operand elements.

54. An array of interconnected processors, at least one of said processors having a decode unit for decoding instructions in a processor, the decode unit comprising opcode decoding logic, operand decoding logic, and a sixteen-bit input;

wherein the opcode decoding logic is operable to determine an opcode using five bits of the sixteen-bit input, there thus being eleven other bits of the sixteen-bit input, and the operand decoding logic is operable to determine three four-bit operand elements from the eleven other bits of the sixteen-bit input, the three four-bit operand elements each having one of twelve possible binary values; and wherein the operand decoding logic is operable to decode non-verbatim encoded group of said eleven other bits of the sixteen-bit input to determine a first part of each of the three four-bit operand elements, and to read verbatim a verbatim group of said eleven other bits of the sixteen-bit input to determine a second part of each of the three four-bit operand elements.

55. A processor comprising:

a decode unit for decoding instructions, the decode unit comprising opcode decoding logic, operand decoding logic, and a sixteen-bit input;

wherein the opcode decoding logic is operable to determine an opcode using five bits of the sixteen-bit input, there thus being eleven other bits of the sixteen-bit input, and the operand decoding logic is operable to determine three four-bit operand elements from the remaining eleven bits of the sixteen-bit input, the three four-bit operand elements each having one of twelve possible binary values; and wherein the operand decoding logic is operable to decode a non-verbatim encoded group of said eleven other bits of the sixteen-bit input to determine a first part of each of the three four-bit operand elements, and to read verbatim a verbatim group of said eleven other bits of the sixteen-bit input to determine a second part of each of the three four-bit operand elements.

56. A decode unit for decoding instructions in a processor, the decode unit comprising:

a sixteen-bit input means for receiving a sixteen-bit instruction;

opcode decoding means for determining an opcode using five bits of the sixteen-bit input means, there thus being eleven other bits of the sixteen-bit input means; and operand decoding means for determining three four-bit operand elements from the eleven other bits of the sixteen-bit input means, the three four-bit operand elements each having one of twelve possible binary values;

wherein the operand decoding means is arranged to decode a non-verbatim encoded group of said eleven other bits of the sixteen-bit input means to determine a first part of each of the three four-bit operand elements, and to read verbatim a verbatim group of said eleven other bits of the sixteen-bit input means to determine a second part of each of the three four-bit operand elements.

57. A decode unit for decoding instructions in a processor, the decode unit comprising:

opcode decoding logic, operand decoding logic, and a sixteen-bit input;

wherein the opcode decoding logic is operable to determine an opcode using five bits of the sixteen-bit input, there thus being eleven other bits of the sixteen-bit input, and the operand decoding logic is operable to determine three operand elements from the eleven other bits of the input, the three operand elements each having one of twelve possible values; and wherein the operand decoding logic is operable to decode a non-verbatim encoded group of said eleven other bits of the sixteen-bit input to determine a first part of each of the three operand elements, and to read verbatim a verbatim group of said eleven other bits to determine a second part of each of the three operand elements.

* * * * *